US011048289B1

(12) United States Patent
Szymanski

(10) Patent No.: US 11,048,289 B1
(45) Date of Patent: Jun. 29, 2021

(54) MONITORING DELAY ACROSS CLOCK DOMAINS USING CONSTANT PHASE SHIFT

(71) Applicant: Rockwell Collins, Inc., Cedar Rapids, IA (US)

(72) Inventor: Anthony Szymanski, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 68 days.

(21) Appl. No.: 16/740,032

(22) Filed: Jan. 10, 2020

(51) Int. Cl.
*G06F 1/06* (2006.01)
*G06F 1/12* (2006.01)

(52) U.S. Cl.
CPC . *G06F 1/06* (2013.01); *G06F 1/12* (2013.01)

(58) Field of Classification Search
CPC ..................................... G06F 1/12; G06F 1/06
See application file for complete search history.

(56) References Cited

U.S. PATENT DOCUMENTS

| 6,172,937 | B1 * | 1/2001 | Ilkbahar | G06F 1/06 365/193 |
| 6,356,127 | B1 | 3/2002 | Klipper et al. | |
| 6,662,305 | B1 * | 12/2003 | Salmon | G06F 1/12 370/503 |
| 7,495,495 | B2 | 2/2009 | Zhang et al. | |
| 7,965,143 | B2 | 6/2011 | Kawamura | |
| 8,225,259 | B1 | 7/2012 | Mendel et al. | |
| 8,514,995 | B1 | 8/2013 | Oh et al. | |
| 8,698,530 | B2 | 4/2014 | Blondel et al. | |
| 9,319,050 | B1 | 4/2016 | Guilford et al. | |
| 9,537,491 | B1 | 1/2017 | Ganusov et al. | |
| 2002/0194520 | A1 * | 12/2002 | Johnson | G06F 9/30098 713/600 |
| 2005/0104639 | A1 * | 5/2005 | Anand | H03L 7/0812 327/158 |
| 2008/0109777 | A1 * | 5/2008 | Morishita | G06F 30/3312 716/103 |
| 2008/0276212 | A1 * | 11/2008 | Albrecht | G06F 30/327 716/122 |
| 2009/0031091 | A1 * | 1/2009 | Chang | G06F 13/1689 711/154 |
| 2011/0099410 | A1 | 4/2011 | Yin et al. | |
| 2011/0176535 | A1 * | 7/2011 | Lipka | H04W 56/0045 370/350 |
| 2017/0054444 | A1 | 2/2017 | Wainwright et al. | |
| 2020/0241589 | A1 * | 7/2020 | Ringe | H03L 7/0812 |

FOREIGN PATENT DOCUMENTS

| CN | 102540865 A | 7/2012 |
| CN | 202586928 U | 12/2012 |
| CN | 102759730 B | 11/2013 |
| CN | 102843127 B | 1/2016 |
| CN | 104077257 B | 1/2017 |
| CN | 108389225 A | 8/2018 |

* cited by examiner

*Primary Examiner* — Phil K Nguyen
(74) *Attorney, Agent, or Firm* — Suiter Swantz pc llo

(57) ABSTRACT

A system and a method. The system may include a computing device configured for monitoring delay across clock domains using a constant phase shift. The computing device may be further configured to: use a counter value, a known clock period of a primary clock domain, and a known clock period of a secondary clock domain to calculate a current offset between a last rising edge of a primary clock and a current rising edge of a secondary clock; monitor a calibration signal to verify alignment such that a zero state occurs when expected; and adjust a counter to maintain the alignment.

15 Claims, 11 Drawing Sheets

| COUNTER VALUE | ADDITIONAL INPUT SIGNAL TO REGISTERED SIGNAL DELAY |
|---|---|
| 0 | 0 ns WHEN PHASE SHIFTED REGISTERED SIGNAL IS NOT EQUAL TO THE REGISTERED SIGNAL |
| 1 | 2 ns |
| 2 | 4 ns |
| 3 | 6 ns |
| 4 | 8 ns |
| 0 | 10 ns WHEN PHASE SHIFTED REGISTERED SIGNAL IS EQUAL TO THE REGISTERED SIGNAL |

FIG. 10

| COUNTER VALUE | ADDITIONAL INPUT SIGNAL TO REGISTERED SIGNAL DELAY |
|---|---|
| 0 | 0 ns |
| 1 | 8 ns |
| 2 | 6 ns |
| 3 | 4 ns |
| 4 | 2 ns |

FIG. 11

MONITORING DELAY ACROSS CLOCK DOMAINS USING CONSTANT PHASE SHIFT

BACKGROUND

Timestamping of data is an important part of characterizing data and analyzing the data in real-time or for post processing. Time alignment of data is important as data fusion from multiple sources becomes more prevalent. When running a single system with a common time source this timing is relatively easy to maintain. As the trend in systems moves to low cost multi-platform systems with more inputs, maintaining time synchronization between systems and data streams becomes more difficult. In order to maintain accurate time relationships, it can become necessary to know delays incurred during clock domain transitions of signals. The clock domains are often unrelated or can vary in their phase relationships from power cycle to power cycle. A method for determining this delay dynamically becomes necessary so that systems can be developed without time consuming calibrations or complex clock synchronization methodologies to achieve synchronization between the clock domains.

SUMMARY

In one aspect, embodiments of the inventive concepts disclosed herein are directed to a system including a computing device. The computing device may be configured to: use clocking resources to generate a phase shifted secondary clock that is equal in frequency to a secondary clock domain, wherein the phase shifted secondary clock is phase shifted by a known amount from a secondary clock; generate a calibration signal in a primary clock domain; capture the calibration signal in each of the secondary clock domain and a phase shifted secondary clock domain; compare a captured calibration signal value in each of the secondary clock domain and the phase shifted secondary clock domain to find a zero state where values are different, wherein the different values indicate that a primary clock domain edge occurred between the secondary clock and a phase shifted secondary clock; generate a counter in the secondary clock domain aligned to a found zero state; use a counter value, a known clock period of the primary clock domain, and a known clock period of the secondary clock domain to calculate a current offset between a last rising edge of the primary clock and a current rising edge of the secondary clock; monitor the calibration signal to verify alignment such that the zero state occurs when expected; and adjust the counter to maintain the alignment.

In a further aspect, embodiments of the inventive concepts disclosed herein are directed to a method. The method may include: using, by a computing device, clocking resources to generate a phase shifted secondary clock that is equal in frequency to a secondary clock domain, wherein the phase shifted secondary clock is phase shifted by a known amount from a secondary clock; generating, by the computing device, a calibration signal in a primary clock domain; capturing, by the computing device, the calibration signal in each of the secondary clock domain and a phase shifted secondary clock domain; comparing, by the computing device, a captured calibration signal value in each of the secondary clock domain and the phase shifted secondary clock domain to find a zero state where values are different, wherein the different values indicate that a primary clock domain edge occurred between the secondary clock and a phase shifted secondary clock; generating, by the computing device, a counter in the secondary clock domain aligned to a found zero state; using, by the computing device, a counter value, a known clock period of the primary clock domain, and a known clock period of the secondary clock domain to calculate a current offset between a last rising edge of the primary clock and a current rising edge of the secondary clock; monitoring, by the computing device, the calibration signal to verify alignment such that the zero state occurs when expected; and adjusting, by the computing device, the counter to maintain the alignment.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 10 is an exemplary table associated with FIGS. 5-9 according to the inventive concepts disclosed herein.

FIG. 11 is an exemplary table associated with FIGS. 5-9 according to the inventive concepts disclosed herein.

DETAILED DESCRIPTION

Figure 1:
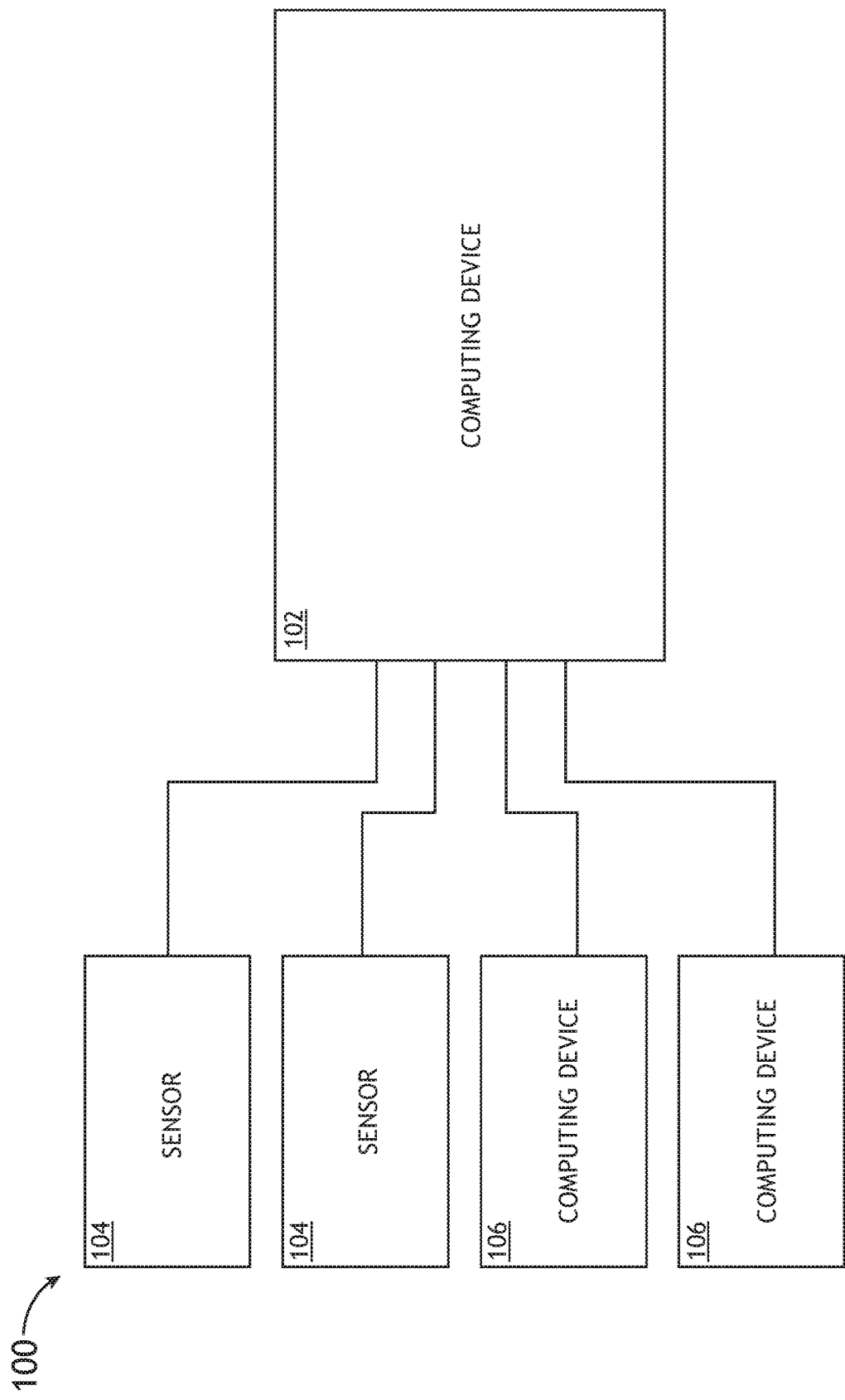
FIG. 1 is a view of an exemplary embodiment of a system according to the inventive concepts disclosed herein.
Figure 3:
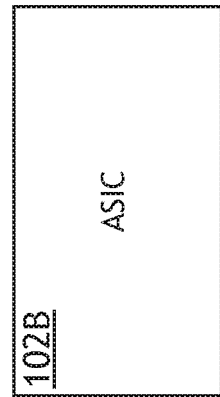
FIG. 3 is a view of the computing device of FIG. 1 as an application-specific integrated circuit (ASIC) of an exemplary embodiment according to the inventive concepts disclosed herein.
Figure 2:
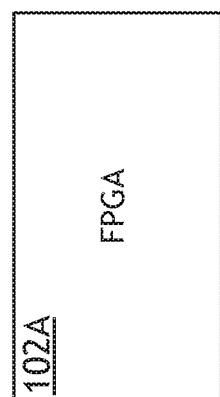
FIG. 2 is a view of the computing device of FIG. 1 as a field-programmable gate array (FPGA) of an exemplary embodiment according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system for monitoring delay across clock domains using a constant phase shift.

As FPGAs get larger and designs and interfaces become more complex, the number of clock frequencies required in a system may increase. Interfaces for dynamic memory and static memory for data storage and retrieval often cause data to cross multiple clock domains while being processed. As designs pursue smaller form factors, the probability of multiple data input sources on independent clock domains may also increase. In many instances the relationships between these domains is not vital information and as long as clock domain crossing is handled properly, there is not a need to know how clocks are related. As systems get smaller and cheaper and provide more processing power, there may be a requirement for more multi-platform data analysis and data fusion. For these analyses, determining the relationship between two clocks to determine a precise time stamp on the data may become more critical.

Many computing devices (e.g., field-programmable gate arrays (FPGAs) and/or application-specific integrated circuits (ASICs)) may offer many clocking resources that can phase shift internal clocks. By phase shifting the secondary clock domain in a manner that allows for catching a common input signal, a zero state can be found. This shift and capture may be possible when the secondary domain is either a faster or slower clock frequency than a primary domain.

Referring now to FIGS. 1-4, an exemplary embodiment of a system 100 according to the inventive concepts disclosed herein is depicted. The system 100 may be implemented as any suitable system, such as a vehicular system (e.g., including least one aircraft, at least one watercraft, at least one submersible craft, at least one automobile, and/or at least one train), a multiple computing device system, and/or a multiple sensor system. For example, as shown in FIG. 1, the system 100 may include a computing device 102, at least one sensor 104, and/or at least one computing device 106, some or all of which may be communicatively coupled at any given time.

Figure 4:
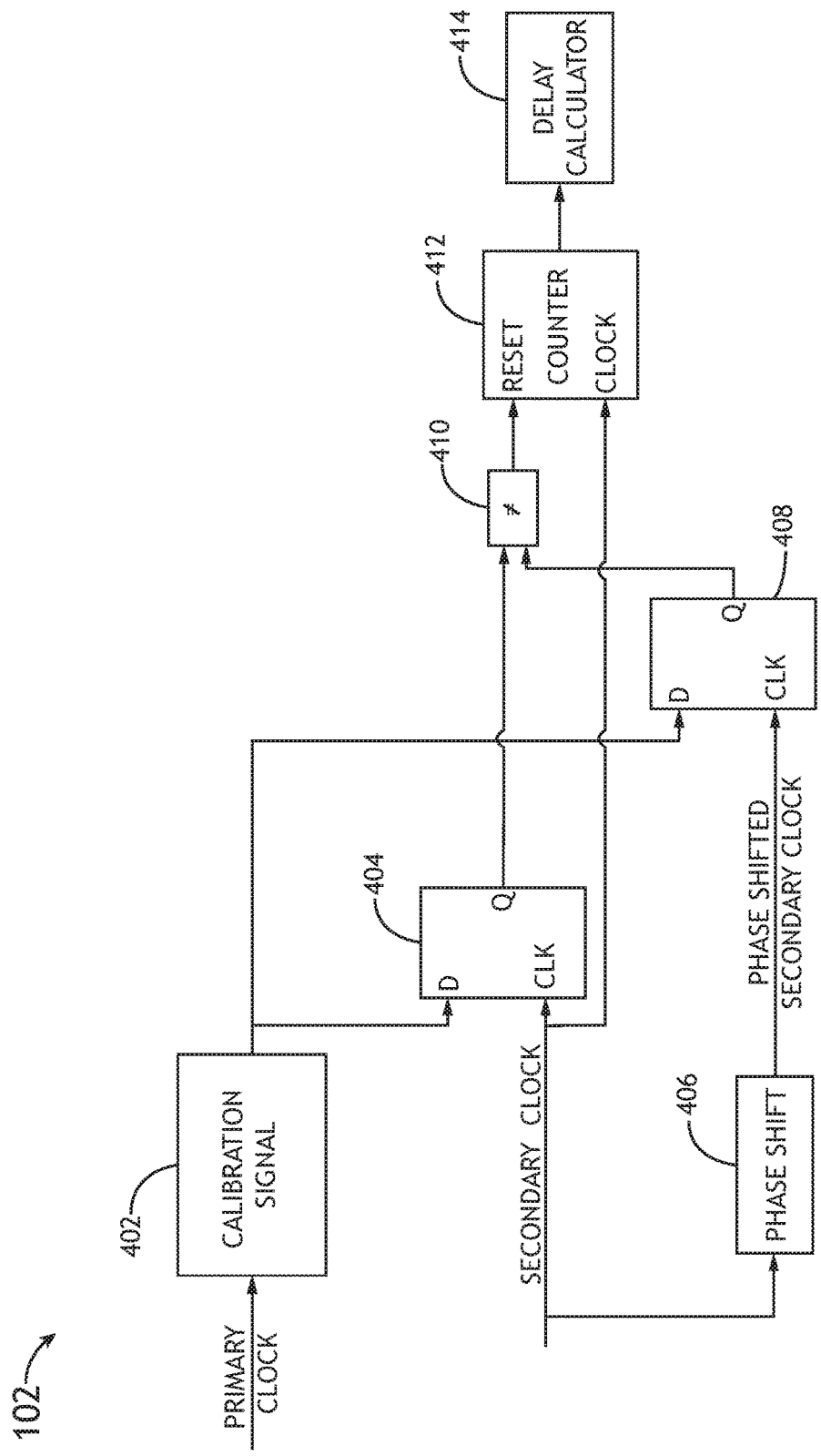
FIG. 4 is a view of the computing device of FIG. 1 of an exemplary embodiment according to the inventive concepts disclosed herein.

For example, the computing device 102 may be or include an FPGA 102A, an ASIC 102B, or a processor (e.g., a general-purpose processor). The computing device 102 may be configured to receive data streams from the sensors 104 and the computing devices 106. The computing device 102 may be configured to monitor delay across clock domains using a constant phase shift. The computing device 102 may be configured to perform any or all of the operations disclosed throughout. As shown in FIG. 4, the computing device 102 may include and/or may utilize a calibration signal 402, a shift register 404, a phase shift 406 (e.g., a static phase shift (e.g., a constant phase shift)), a shift register 408, a comparator 410, a counter 412, and/or a delay calculator 414, some or all of which may be communicatively coupled at any given time.

The sensors 104 may be configured to sense conditions and output sensor data streams to the computing device 102.

The computing devices 106 may be configured to output data streams to the computing device 102. For example, each of the computing devices 106 may be or include an FPGA, an ASIC, or a processor (e.g., a general-purpose processor).

As used throughout, a primary clock may refer to an initial clock domain of a system where data is captured/generated.

As used throughout, a secondary clock may refer to a clock domain where data is transferred to.

As used throughout, a phase shift may refer to a delay in degrees or units of time that creates a clock identical in frequency but delayed by a known amount.

As used throughout, a zero state may refer to a position in data between two clock domains where the primary and secondary clock edges are very close, found by looking for differences in a calibration signal between the secondary clock and a phase shifted secondary clock indicating that the primary clock edge was between the two secondary clocks.

As used throughout, a static phase shift may refer to a phase shift that is a fixed amount of time and that does not change.

The computing device 102 may be configured to: use clocking resources to generate a phase shifted secondary clock that is equal in frequency to a secondary clock domain, wherein the phase shifted secondary clock is phase shifted by a known amount from a secondary clock; generate a calibration signal in a primary clock domain; capture the calibration signal in each of the secondary clock domain and a phase shifted secondary clock domain; compare a captured calibration signal value in each of the secondary clock domain and the phase shifted secondary clock domain to find a zero state where values are different, wherein the different values indicate that a primary clock domain edge occurred between the secondary clock and a phase shifted secondary clock; generate a counter in the secondary clock domain aligned to a found zero state; use a counter value, a known clock period of the primary clock domain, and a known clock period of the secondary clock domain to calculate a current offset between a last rising edge of the primary clock and a current rising edge of the secondary clock; monitor the calibration signal to verify alignment such that the zero state occurs when expected; and/or adjust the counter to maintain the alignment.

In some embodiments, the computing device 102 may be further configured to: align data across clock domains (e.g., for data fusion); align time of data from a first sensor 104 and a second sensor 104, wherein the first sensor 104 and the second sensor 104 are running at different clock rates; maintain accurate time of day synchronization in multiple clock domains for data time tagging; time tag data; and/or perform cryptographic operations.

Figure 5:
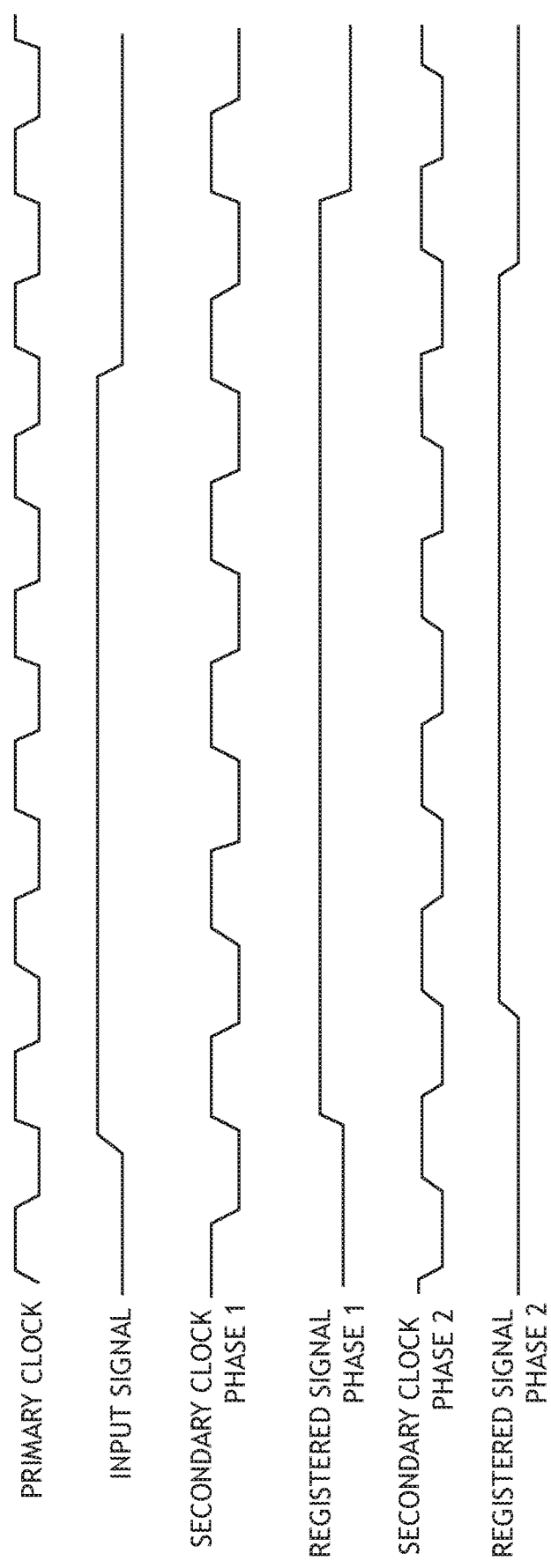
FIG. 5 is an exemplary graph illustrating that signals that pass between clock domains can have ambiguities that approach tens of nanoseconds if the phase relationship between the clocks is unknown, of an exemplary embodiment according to the inventive concepts disclosed herein.

Referring now to FIG. 5, an exemplary graph illustrating that signals that pass between clock domains can have ambiguities that approach tens of nanoseconds if the phase relationship between the clocks is unknown, of an exemplary embodiment according to the inventive concepts disclosed herein is depicted. The input signal may toggle on the rising edge of the primary clock. Registering the signal into the secondary clock domain with the Clock Phase 1 may happen very quickly after the rising edge of the primary clock. For the secondary Clock Phase 2, the signal may be much later. Accurately timing the input signal may require knowledge of the phase of the secondary clock. The example shown has eight nanoseconds of ambiguity as drawn, and in reality, could align anywhere within the period of the primary clock. The relationship may also be prone to change from one power cycle to the next.

The zero state may be found by doing a phase shift that pushes a phase shifted clock, leading the non-phase shifted clock by a small amount. Negative phase shifting, if supported, or a phase shift of nearly 360 degrees can do this.

The zero state can be found when the phase shifted data does not match the non-phase shifted data. This data can be an input signal if the signal occurs periodically and the likelihood of passing through a zero state is high, or the data can be an internal calibration signal.

Figure 6:
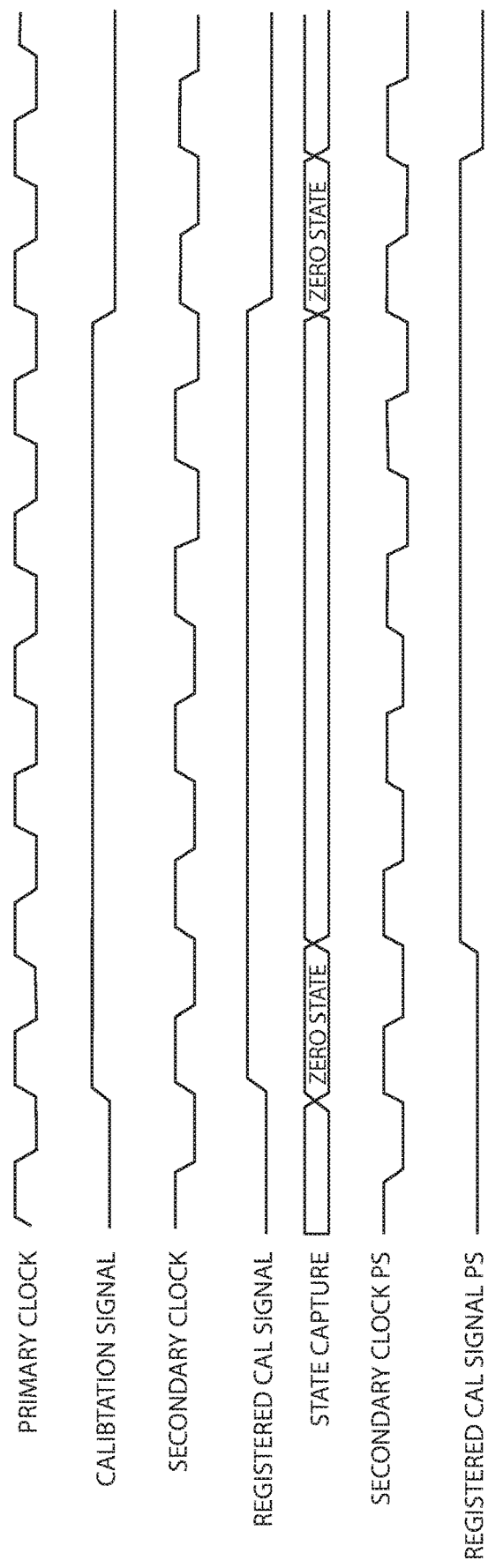
FIG. 6 is an exemplary graph illustrating establishing when the signal changed between the two phase shifted secondary clocks of an exemplary embodiment according to the inventive concepts disclosed herein.

Referring now to FIG. 6, an exemplary graph illustrating establishing when the signal changed between the two phase shifted secondary clocks of an exemplary embodiment according to the inventive concepts disclosed herein is depicted. The clock frequencies used in this example are 100 MHz and 83.33 MHz (periods of 10 ns and 12 ns respectively). The amount that the phase shifted clock leads may determine the maximum ambiguity of the measurement. In FIG. 6, the phase shifted secondary clock (Secondary Clock PS) may lead the secondary clock by one nanosecond. This may allow for finding a state where the input signal as monitored by the secondary clock is active but not active on the phase shifted clock, meaning that the signal changed within that one nanosecond window.

Once the zero state is defined, the clock domains can be monitored via a counter (e.g., a state machine) as long as the two clock frequencies are fixed. The secondary clock domain may walk through the first and eventually wrap back around to the zero state. This may be a long process spanning many clock cycles depending on the input frequencies and the phase shift used to determine the zero state. The rollover may be defined by the least common multiple of the clock periods. For example, with 10 ns and 12 ns clock periods, this happens every fifth clock in the 12 ns clock domain or at 60 ns. The counter or state machine should be set up to roll back to a known count or state at this interval.

Figure 7:
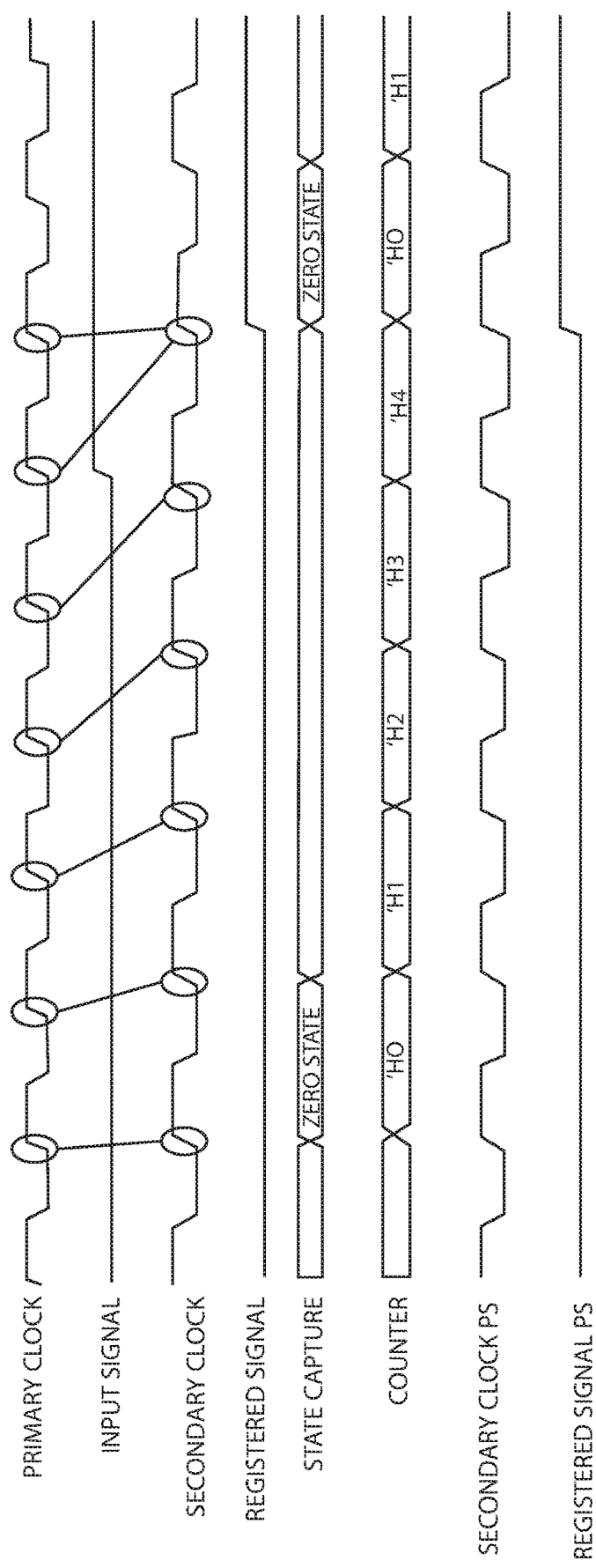
FIG. 7 is an exemplary graph illustrating how each of the clock periods may increase the delay between the clocks until the counter rolls over and the zero state is seen again of an exemplary embodiment according to the inventive concepts disclosed herein.

Each counter increment may correspond to a time shift in the relationship of the clock periods (2 ns for this example). Constant monitoring of when the zero state occurs should be used as an error check, as well, since when the zero state occurs should be periodic and predictable. The monitoring can be done with an internal signal or an input signal. The internal signal period or timing can be controlled to maintain a constant rate outside of the least common multiple period to guarantee hitting all of the counter states, or by varying the delay to find and guarantee hitting the zero state consistently. FIG. 7 shows how each of the clock periods may increase the delay between the clocks until the counter rolls over and the zero state is seen again. The ovals may indicate the primary clock edges and related secondary clock edges. Since the primary clock is faster, there may be occasions where multiple primary clock edges may have the same secondary clock edge; this scenario may manifest by having the phase shifted registered signal equal to the registered signal at the zero count indicating a full primary clock period of extra delay. In instances where the secondary clock is faster than the primary clock, this may not occur, but not all secondary clock edges may correspond to a unique rising primary clock edge.

Figure 8:
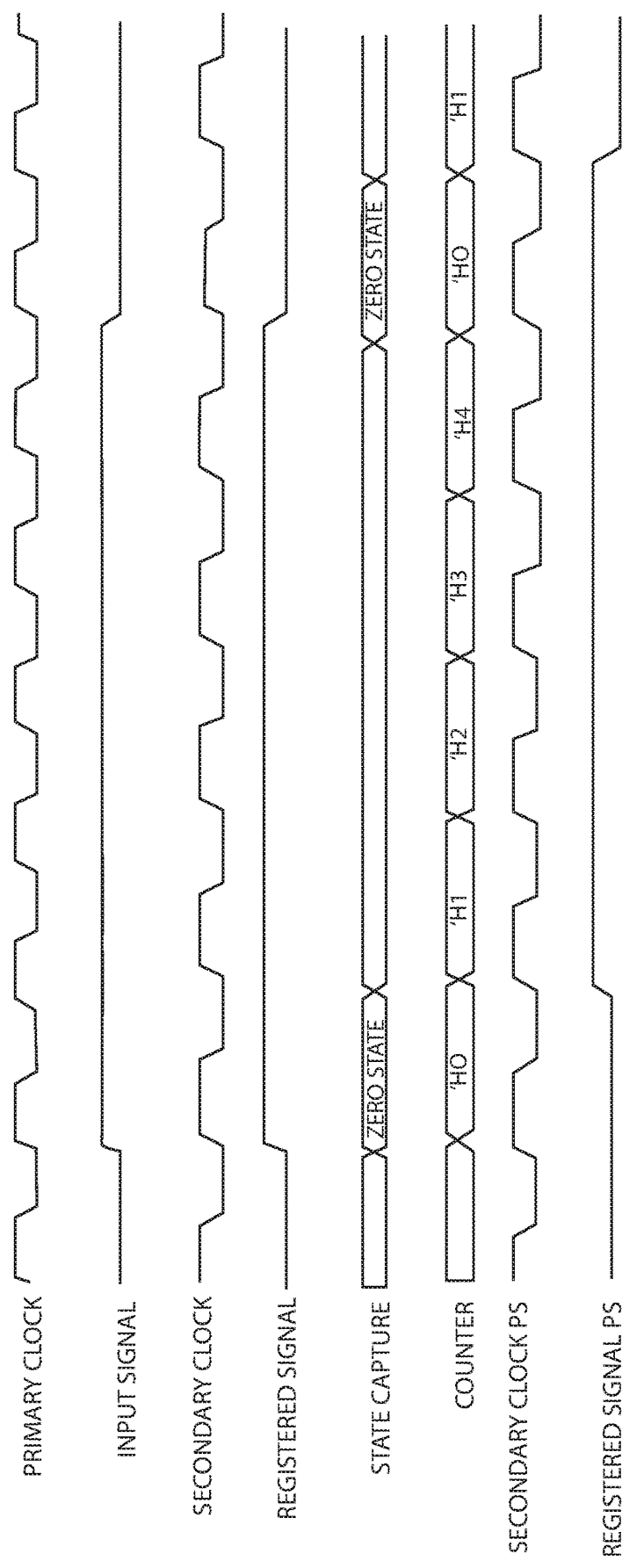
FIG. 8 is an exemplary graph illustrating a system where the zero state is encountered every fifth clock period and how the delay can be adjusted to account for the clock relationship on a clock-by-clock basis of an exemplary embodiment according to the inventive concepts disclosed herein.

Referring now to FIG. 8, an exemplary graph illustrating a system where the zero state is encountered every fifth clock period and how the delay can be adjusted to account for the clock relationship on a clock-by-clock basis of an exemplary embodiment according to the inventive concepts disclosed herein is depicted. Both rising and falling edges can be used for detection of the zero state. For each counter increment, the relationship of the secondary clock edge may move back by two nanoseconds and repeat on the fifth clock cycle.

Figure 9:
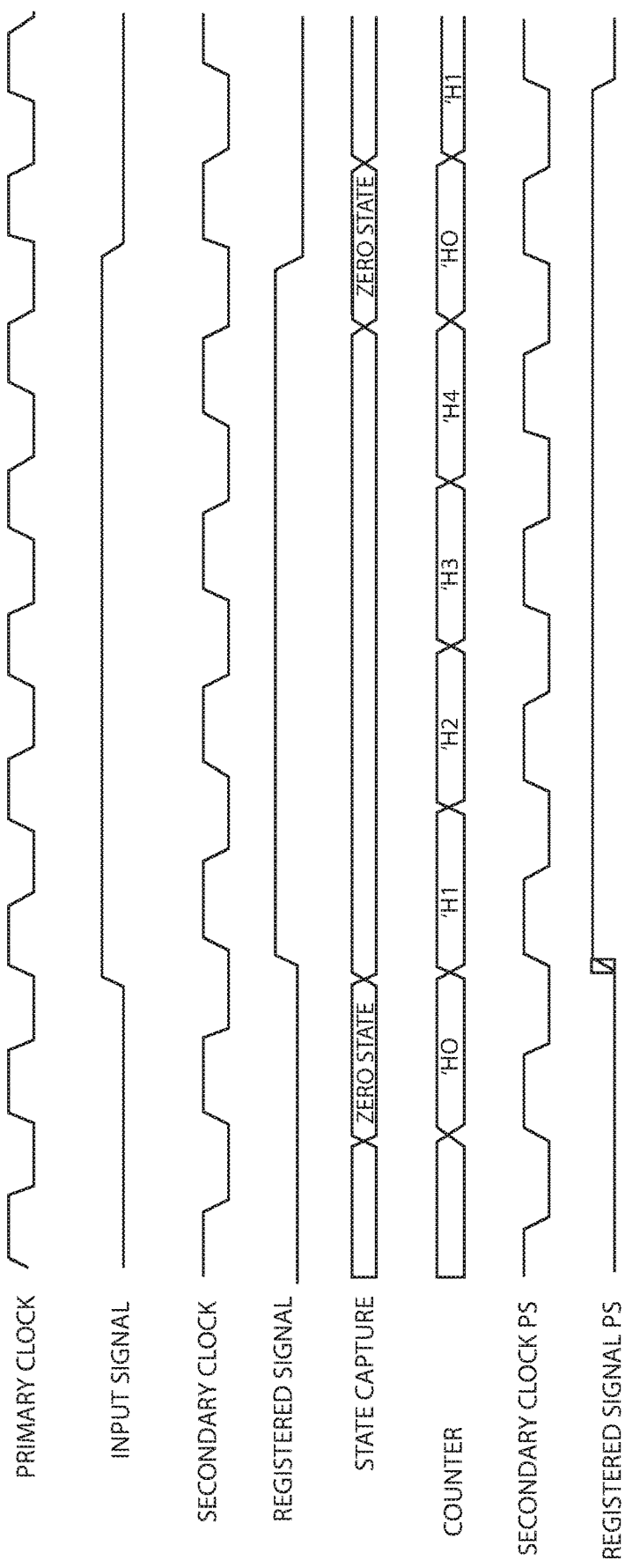
FIG. 9 is an exemplary graph illustrating an input signal that does not arrive at the zero state of an exemplary embodiment according to the inventive concepts disclosed herein.

Referring now to FIG. 9, an exemplary graph illustrating an input signal that does not arrive at the zero state of an exemplary embodiment according to the inventive concepts disclosed herein is depicted. The registered signal may be captured at the same time that the counter increments from zero to one. This example shows how the phase shifted secondary clock may capture the data prior to the non-shifted secondary clock indicating that it is not the zero state. FIG. 9 also shows that the delay from the input signal to the registered signal has increased.

The counter may provide mapping to a delay value shown in the table of FIG. 10 to provide an accurate clock-to-clock additional delay between the clock domains to determine accurate time stamps across clock domains. For each counter increment the delay increases by two nanoseconds due to the 10 ns and 12 ns clock period used in this example, as shown by the following equation:

Secondary clock period−Primary clock period=additional delay per count.

For secondary clocks that are faster than the primary clock, the delay can be found as shown in the following equation:

Count*Secondary clock period−X*Primary Clock period=additional delay, where X is an integer number of clocks in the primary clock domain that results in the largest possible value that is still smaller than the count multiplied by the secondary clock period.

The table illustrated in FIG. 11 shows an example using clock periods of 10 ns and 8 ns for the primary and secondary clocks. It can be seen that since the secondary clock period is less than the primary clock period, the value of X would be zero resulting in a delay of a full secondary clock period. At a count of 2 the secondary clock has had 16 ns from zero state which is 6 ns off of the 10 ns primary clock period (X=1). From there, it can be seen that the delays of 24 ns and 32 ns (counts of 3 and 4 respectively) correspond to 4 ns delay and 2 ns delay respectively.

This may limit the region of the clock ambiguity to the one nanosecond difference between the phase shifted secondary clock and the non-phase shifted secondary clock, and can be adjusted every clock cycle to determine an accurate time of arrival of the input signal in the secondary clock domain. The examples cited here may have an assumption of leading edges being somewhat aligned. This is often the case when the two clock domains are derived from the same source within the computing device. In systems where the clocks are completely unrelated, multiple phase shifted versions of the clock may be required to find the alignment at the desired accuracy.

Keeping accurate delay information across clock domains on a multi-platform system may limit the ambiguity that can occur between clock domain transitions. Some embodiments for determining a zero state and utilization of a counter may not require any information beyond the frequencies of the clock domains and may manage to automatically determine clock phase and delay on a clock-by-clock basis allowing for precise synchronization across multiple systems that operate multiple clock domains.

Figure 12:
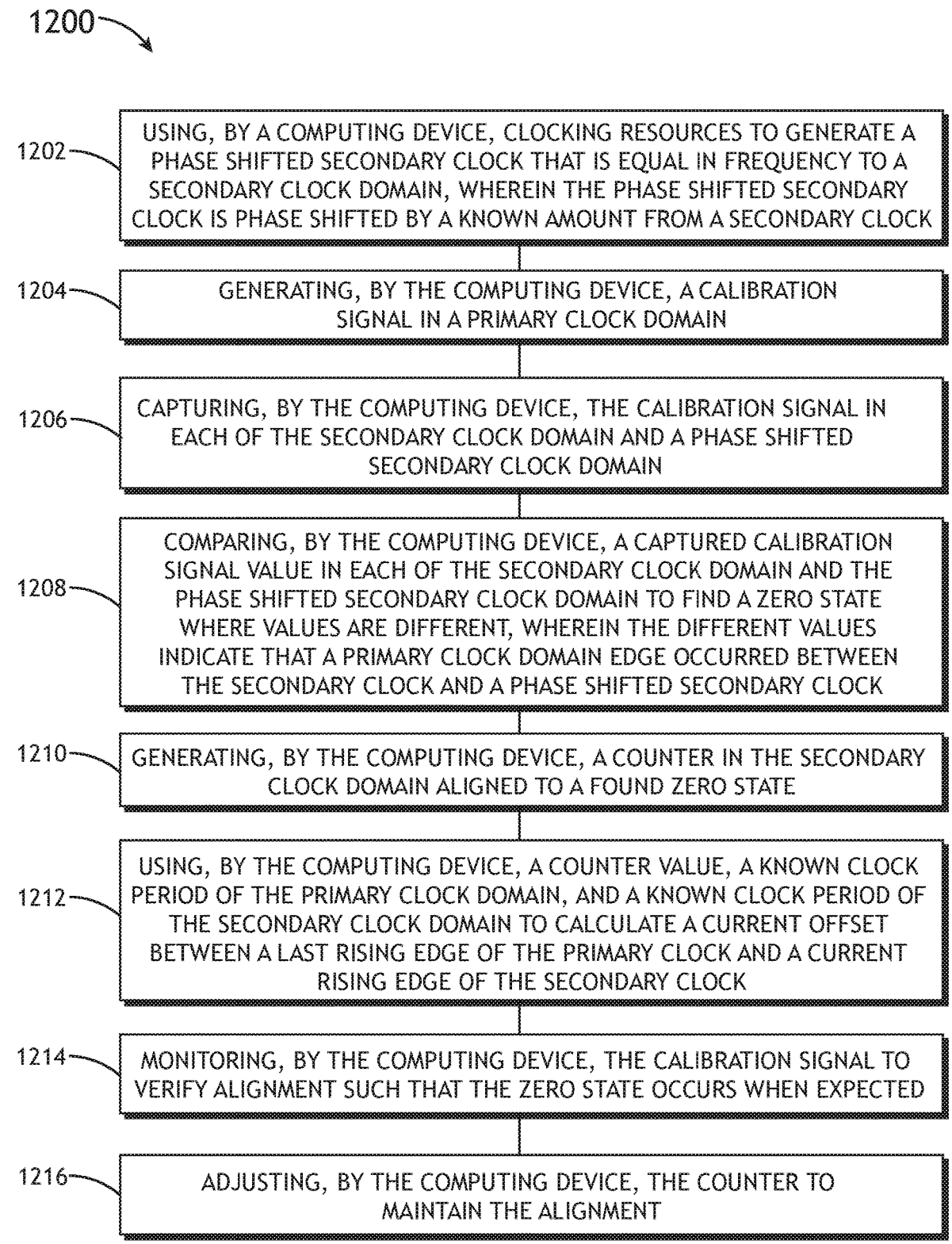
FIG. 12 is a diagram of an exemplary embodiment of a method according to the inventive concepts disclosed herein.

Referring now to FIG. 12, an exemplary embodiment of a method 1200 according to the inventive concepts disclosed herein may include one or more of the following steps. Additionally, for example, some embodiments may include performing one more instances of the method 1200 iteratively, concurrently, and/or sequentially. Additionally, for example, at least some of the steps of the method 1200 may be performed in parallel and/or concurrently. Additionally, in some embodiments, at least some of the steps of the method 1200 may be performed non-sequentially.

A step 1202 may include using, by a computing device, clocking resources to generate a phase shifted secondary clock that is equal in frequency to a secondary clock domain, wherein the phase shifted secondary clock is phase shifted by a known amount from a secondary clock.

A step 1204 may include generating, by the computing device, a calibration signal in a primary clock domain.

A step 1206 may include capturing, by the computing device, the calibration signal in each of the secondary clock domain and a phase shifted secondary clock domain.

A step 1208 may include comparing, by the computing device, a captured calibration signal value in each of the secondary clock domain and the phase shifted secondary clock domain to find a zero state where values are different, wherein the different values indicate that a primary clock domain edge occurred between the secondary clock and a phase shifted secondary clock.

A step 1210 may include generating, by the computing device, a counter in the secondary clock domain aligned to a found zero state.

A step 1212 may include using, by the computing device, a counter value, a known clock period of the primary clock domain, and a known clock period of the secondary clock domain to calculate a current offset between a last rising edge of the primary clock and a current rising edge of the secondary clock.

A step 1214 may include monitoring, by the computing device, the calibration signal to verify alignment such that the zero state occurs when expected.

A step 1216 may include adjusting, by the computing device, the counter to maintain the alignment.

Further, the method 1200 may include any of the operations disclosed throughout.

As will be appreciated from the above, embodiments of the inventive concepts disclosed herein may be directed to a method and a system for monitoring delay across clock domains using a constant phase shift.

As used throughout and as would be appreciated by those skilled in the art, "at least one non-transitory computer-readable medium" may refer to as at least one non-transitory computer-readable medium (e.g., e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
    a computing device configured to:
        use clocking resources to generate a phase shifted secondary clock that is equal in frequency to a secondary clock domain, wherein the phase shifted secondary clock is phase shifted by a known amount from a secondary clock;
        generate a calibration signal in a primary clock domain;
        capture the calibration signal in each of the secondary clock domain and a phase shifted secondary clock domain;
        compare a captured calibration signal value in each of the secondary clock domain and the phase shifted secondary clock domain to find a zero state where values are different, wherein the different values indicate that a primary clock domain edge occurred between the secondary clock and a phase shifted secondary clock;
        generate a counter in the secondary clock domain aligned to a found zero state;
        use a counter value, a known clock period of the primary clock domain, and a known clock period of the secondary clock domain to calculate a current offset between a last rising edge of the primary clock and a current rising edge of the secondary clock;
        monitor the calibration signal to verify alignment such that the zero state occurs when expected; and
        adjust the counter to maintain the alignment.

2. The system of claim 1, wherein the phase shifted secondary clock is a constant phase shifted secondary clock.

3. The system of claim 1, wherein the computing device is further configured to align data across clock domains.

4. The system of claim 1, wherein the computing device is further configured to align data across clock domains for data fusion.

5. The system of claim 1, further comprising a first sensor and a second sensor, wherein the computing device is further configured to align time of data from the first sensor and the second sensor, wherein the first sensor and the second sensor are running at different clock rates.

6. The system of claim 1, wherein the computing device is further configured to: maintain accurate time of day synchronization in multiple clock domains for data time tagging; and time tag data.

7. The system of claim 1, wherein the computing device is a field-programmable gate array (FPGA).

8. The system of claim 1, wherein the computing device is an application-specific integrated circuit (ASIC).

9. A method, comprising:
    using, by a computing device, clocking resources to generate a phase shifted secondary clock that is equal in frequency to a secondary clock domain, wherein the phase shifted secondary clock is phase shifted by a known amount from a secondary clock;
    generating, by the computing device, a calibration signal in a primary clock domain;
    capturing, by the computing device, the calibration signal in each of the secondary clock domain and a phase shifted secondary clock domain;
    comparing, by the computing device, a captured calibration signal value in each of the secondary clock domain and the phase shifted secondary clock domain to find a zero state where values are different, wherein the different values indicate that a primary clock domain edge occurred between the secondary clock and a phase shifted secondary clock;
    generating, by the computing device, a counter in the secondary clock domain aligned to a found zero state;
    using, by the computing device, a counter value, a known clock period of the primary clock domain, and a known clock period of the secondary clock domain to calculate a current offset between a last rising edge of the primary clock and a current rising edge of the secondary clock;
    monitoring, by the computing device, the calibration signal to verify alignment such that the zero state occurs when expected; and
    adjusting, by the computing device, the counter to maintain the alignment.

10. The method of claim 9, further comprising aligning, by the computing device, data across clock domains.

11. The method of claim 9, further comprising aligning, by the computing device, data across clock domains for data fusion.

12. The method of claim 9, further comprising aligning, by the computing device, time of data from a first sensor and a second sensor, wherein the first sensor and the second sensor are running at different clock rates.

13. The method of claim 9, further comprising: maintaining, by the computing device, accurate time of day synchronization in multiple clock domains for data time tagging; and time tagging data by the computing device.

14. The method of claim 9, wherein the computing device is a field-programmable gate array (FPGA).

15. The method of claim 9, wherein the computing device is an application-specific integrated circuit (ASIC).

* * * * *